Patented Feb. 9, 1943

2,310,794

UNITED STATES PATENT OFFICE 2,310,794

RESINS FROM FUSED UREA

Otto L. Kupfer, New York, N. Y., assignor to Stein, Hall & Company, Inc., New York, N. Y., a corporation of New York No Drawing. Application May 1, 1940, Serial No. 332,689

15 Claims. (Cl. 260—69)

This invention relates to new condensation products, and to a new method of forming resins in which urea and solid formaldehyde compounds are employed as the raw materials.

It is common practice to form resins by the condensation of urea and formaldehyde in aqueous solution. However, the presence of water in the reaction mixture may render the final resinous product porous and of cloudy transparency, which, in many cases, is undesirable. Accordingly, it has been the practice to eliminate the aqueous component from the resin by dehydration, which is usually accomplished by vacuum distillation of the resinous product. This additional step in the resin manufacture is of critical nature because of the tendency of the resin to gelatinize during distillation.

It has been proposed to eliminate this factor in resin manufacture by carrying out the condensation reaction in the anhydrous state employing the solid polymers of formaldehyde, thus eliminating the presence of water in the reaction mixture. Such processes have not been adapted to commercial scale operations in view of the relatively high cost of the solid formaldehyde polymers, and the large proportions of polymer to the urea ingredient required. For example, in the prior art, it has been found necessary to employ at least equal molar proportions of urea and formaldehyde in forming the reaction mixture, even with the addition of catalysts or accelerators thereto. A typical example of reaction mixture comprises 1 mole of urea to 1 to 2 moles of formaldehyde.

It is an object of the invention to provide a novel method of carrying out the condensation of urea with solid formaldehyde compounds.

A further object is to provide a novel method of condensing urea and solid formaldehyde compounds, utilizing considerably less of the formaldehyde compound in proportion to the urea ingredient, than has heretofore been considered necessary.

A further object is to provide a novel method of condensing urea and solid formaldehyde compounds, whereby the condensation reaction may be accurately controlled at different stages to provide resins having the desired properties of hardness, water solubility and transparency.

Still a further object is to provide a novel resinous condensate of urea and a formaldehyde compound.

A further object is to carry out the condensation in two stages to produce condensation products that are water-soluble in both stages, the condensation in the second stage being such that it may be carried out in the presence of other materials.

Other objects and advantages of the invention will be apparent from the following description.

It has been discovered that condensation products obtained by utilizing urea and solid formaldehyde compounds as the reactants may advantageously be formed by fusing the urea in the dry state at elevated temperatures prior to combination with the solid formaldehyde compound.

In carrying out the invention, the solid formaldehyde compound may preferably comprise a solid polymer of formaldehyde such as paraformaldehyde or trioxymethylene or a solid derivative of formaldehyde having the property of condensing with urea to form a resin, for example, hexamethylenetetramine. It is preferred that the solid formaldehyde compound employed be as free from water as is conveniently possible, in order to minimize or entirely eliminate the presence of water from the reaction mixture. The invention contemplates the use of these compounds or their equivalents substantially interchangeably in forming the reaction mixture, the choice of formaldehyde compound depending upon the cost and availability thereof and the properties desired in the resin. For purposes of illustrating the invention, the method thereof will be described with reference to paraformaldehyde as the reactant employed with the urea in forming the reaction mixture.

In accordance with the invention, the urea is heated and maintained at a temperature and for such an interval of time as will effect dissociation of the urea and recombination of the dissociation products to form biuret. After the fusion has become clear, a solid formaldehyde compound, such as paraformaldehyde or trioxymethylene, is added to the biuret melt, and the fusion heated to cause condensation of the paraformaldehyde and biuret to proceed. By cooling the reaction mixture at the end of this interval, a whitish water-soluble viscous resin is obtained, which may be modified by subsequent hardening treatment to form a hard transparent resin, if desired.

It has been found that by modifying the urea prior to addition of the paraformaldehyde, as low a proportion of ingredients as 1 mole of paraformaldehyde to 12 moles of urea is sufficient to effect complete condensation, this proportion being the equivalent by weight of about 1 part of paraformaldehyde to 8 parts of urea. In determining the molar proportions of paraformaldehyde, for practical purposes the latter is regarded as the equivalent of trioxymethylene, comprising the condensation product of 3 molecules of formaldehyde. While larger amounts of paraformaldehyde may be used, the above range is preferred; the addition of more of the paraformaldehyde effects little or no improvement in the properties of the resinous condensate, and undesirably appreciates the cost of the resin.

Dissociation of the urea during the fusion is accompanied by the loss of a molecule of free ammonia for every two molecules of urea, the urea molecules combining to form biuret. It is desirable that transformation of the urea to biuret be at least substantially completed before the paraformaldehyde is added to the fusion. This may be ascertained by the freedom of the melt from the odor of free ammonia due to dissociation of the urea. In practice, it has been found that the paraformaldehyde may be added to the urea melt when it assumes an unclouded transparency, which indicates that the transformation of urea to biuret is substantially complete. The presence of biuret in the melt or in the resulting resin may be ascertained by testing with a mildly alkalized solution of a copper salt, such as copper sulfate, to obtain the well known violet or violet-red color, or "biuret reaction" of copper salts in the presence of biuret.

If desired, the condensation reaction of the biuret and paraformaldehyde may be modified by adding to the fusion a mildly alkaline catalytic agent, which may be selected from a broad class of condensing agents well known to the art. Alkaline agents such as sodium borate, sodium acetate and other weakly basic salts tend to retard the condensation and are employed to maintain the fluidity of the fusion for a longer time, permitting accurate control of the degree to which the condensation reaction proceeds. The retarders may be added to the fusion at any time prior to initiation of the condensation reaction, for example with the paraformaldehyde ingredient or at any time before incorporation of the paraformaldehyde in the urea melt. However, it is preferred to admix the alkaline salt with the urea prior to fusion thereof for purposes of transforming the urea to biuret. The alkaline salt increases the yield of biuret and lowers the temperature at which conversion of the urea to biuret will occur. The alkaline salt also lowers the melting point of the mass and permits of slower heating, thereby preventing undue frothing of the fusion, particularly upon incorporation of the paraformaldehyde.

The following example of a preferred formula for use in carrying out the invention is given for illustrative purposes only and the invention is not to be regarded as limited thereto.

*Example*

Urea ----------------------------------- gr. 96
Paraformaldehyde ----------------------- gr. 12
Sodium borate ------------------ Small amount The small amount of sodium borate is mixed with the urea, and the mixture fused at between 120° C. and 130° C. until the fusion becomes clear. The time required will depend upon the amount of urea being heated and other factors. In the above example, about 15 minutes is ample. If the reaction mixture is prepared in larger proportions than those indicated in the example, the initial fusing of the urea to form a transparent melt, indicating the formation of biuret, will take appreciably longer, for it will be necessary to heat the mixture slowly in order to avoid overheating of the outer portions of the mass. The amount of borax employed is that well known in the art and will vary from a fraction of a gram to several grams, depending on the rate of reaction desired, the amount of ingredients employed, and other factors recognized in the art. The paraformaldehyde is then added all at once to the biuret melt and the mixture heated gently at about 100° C. to 120° C. for two hours to initiate condensation of the biuret and paraformaldehyde. Upon cooling of the melt, a soft, whitish, water-soluble resin is obtained.

Upon heating of the resin obtained in this first phase of the reaction at an elevated temperature ranging between 150° C. and 160° C. for about one hour, followed by cooling of the mixture, a hard, light brown, water-soluble, transparent resin is formed which may be machined or comminuted for molding purposes in the usual manner.

If a water-insoluble resin is desired, the resin formed during the initial reaction phase may be converted to a water-insoluble form by adding an acid or acid reacting salt to the resin in an amount sufficient to render a water solution of the resin slightly acidic, and heating the mixture for ten to fifteen minutes at a temperature of about 100° C. to 120° C. Completion of the reaction is indicated by formation of a whitish-yellow precipitate, which may be separated and dried for subsequent molding or casting operations. The conversion to a water-insoluble stage may also be effected by heating the water-soluble resin at a temperature of about 140° C. for twelve hours. In both of the above instances, a hard fusible transparent yellow resin is formed which may be hot-pressed directly, machined, or powdered for pressure molding operations.

As pointed out previously, other solid formaldehyde compounds such as trioxymethylene and hexamethylenetetramine, or equivalents of these compounds, may be substituted for paraformaldehyde in carrying out the method of the invention.

By transforming the urea to biuret in the manner of the invention, prior to addition of the solid formaldehyde compound to the fusion, the amount of this latter ingredient necessary to effect complete reaction with the urea is considerably reduced, effecting a substantial saving in the cost of production of the resins.

The resins formed in accordance with the invention may be adapted to widely varied uses, for instance, in the formation of plastics and as an adhesive. The resinous product is particularly useful when employed in connection with textile materials. If desired other ingredients normally used in the molding or textile industry may be incorporated in the resin obtained in the first stage and the second stage of the condensation carried out in the presence of such materials.

It is to be understood that the examples given are merely illustrative and comprehend the substitution of equivalents where possible.

I claim:

1. The method of forming a condensation product of urea and a dry solid formaldehyde compound comprising fusing urea to effect substantial transformation of the urea to biuret, subsequently adding to the fusion a dry formaldehyde compound selected from the group consisting of the solid polymers of formaldehyde and hexamethylenetetramine, and heating the mixture in the absence of water to form the resin.

2. A method of forming a condensation product of urea and a dry solid polymer of formaldehyde comprising fusing the urea until the fusion becomes clear, subsequently adding the dry solid polymer of formaldehyde to the fusion, and heating the mixture in the absence of water to form the resin.

3. A method of forming a condensation product of urea and hexamethylenetetramine comprising fusing the urea until the fusion becomes clear, subsequently adding hexamethylenetetramine to the fusion, and heating the mixture in the absence of water to form the resin.

4. A method of forming a condensation product of urea and paraformaldehyde comprising fusing the urea to substantially transform the urea to biuret, subsequently adding paraformaldehyde to the fusion and heating the mixture in the absence of water to form the resin.

5. A method of forming a condensation product of urea and paraformaldehyde comprising fusing the urea until the fusion becomes clear to substantially transform the urea to biuret, subsequently adding paraformaldehyde all at once to the fusion, and heating the mixture to form the resin, the condensation reaction being carried out in the absence of an aqueous component.

6. A method of forming a condensation product of urea and paraformaldehyde comprising fusing the urea to form biuret, subsequently adding paraformaldehyde to the fusion in the proportion of as little as 1 part of paraformaldehyde to 8 parts of urea, and heating the mixture in the absence of water to form the resin.

7. A method of forming a condensation product of urea and paraformaldehyde comprising fusing the urea to form biuret, subsequently adding paraformaldehyde to the fusion in the proportion of about 1 part of paraformaldehyde to 8 parts of urea by weight, and heating the mixture to form the resin.

8. A method of forming a condensation product of urea and paraformaldehyde comprising fusing the urea to form biuret, subsequently adding paraformaldehyde to the fusion, and heating the mixture in the absence of water in the presence of a non-aqueous mildly alkaline retarding agent to form the resin.

9. A method of forming a condensation product of urea and paraformaldehyde comprising fusing urea in the presence of a non-aqueous mildly alkaline retarding agent until the fusion is clear, subsequently adding paraformaldehyde to the fusion, and heating the mixture in the absence of water to form the resin.

10. A method of forming a condensation product of urea and paraformaldehyde comprising fusing a mixture of urea and a small proportion of a mildly alkaline reacting salt until the fusion is clear, subsequently adding paraformaldehyde to the fusion and gently heating the mixture in the absense of water to form the resin.

11. A method of forming a condensation product of urea and paraformaldehyde comprising fusing a mixture of urea and a small proportion of sodium borate until the fusion is clear, subsequently adding paraformaldehyde to the fusion and gently heating the mixture in the absence of water to form the resin.

12. A method of forming a condensation product of urea and paraformaldehyde comprising fusing a mixture of urea and sodium borate in the dry state until the fusion is clear, subsequently adding paraformaldehyde to the fusion, and heating the fusion for about 2 hours at 100° C. to 120° C. to form a soft, whitish, water-soluble resin.

13. A method of forming a condensation product of urea and paraformaldehyde comprising fusing the urea until the fusion is clear, subsequently adding paraformaldehyde to the fusion, and condensing the ingredients in two stages by gently heating the mixture in the absence of water to form a soft water-soluble resin, dissolving said resin in water, acidulating, and heating to form an insoluble resin.

14. A method of forming a condensation product of urea and paraformaldehyde comprising fusing a mixture of urea and a mildly alkaline reacting salt in the dry state until the fusion is clear, subsequently adding paraformaldehyde to the fusion, gently heating the mixture in the absence of water to form a soft whitish resin, and further heating the resin at between 150° C. and 160° C. for about 1 hour to form a hard, light brown resin.

15. A method of forming a condensation product of urea and a dry formaldehyde compound comprising fusing urea in the presence of a non-aqueous mildly alkaline retarding agent until the fusion is clear, subsequently adding to the fusion a dry formaldehyde compound selected from the group consisting of the solid polymers of formaldehyde and hexamethylenetetramine, and gently heating the mixture in the absence of water to form the resin.

OTTO L. KUPFER.